United States Patent
Blair

[15] 3,694,100
[45] Sept. 26, 1972

[54] ADJUSTABLE DRILL JIG
[72] Inventor: Lesley W. Blair, 605 - Third Ave., N.W., Pocahontas, Iowa 50574
[22] Filed: March 22, 1971
[21] Appl. No.: 126,592

[52] U.S. Cl. ............... 408/105, 269/87.3, 33/185 R
[51] Int. Cl. ............................................. B27g 23/00
[58] Field of Search ........... 408/105, 108, 75, 85, 97; 33/191, 185; 269/288, 87.3

[56] References Cited

UNITED STATES PATENTS

| | | | |
|---|---|---|---|
| 2,451,035 | 10/1948 | Marsilius | 408/97 |
| 2,453,482 | 11/1948 | Woolson | 408/97 |
| 2,823,564 | 2/1958 | Lentino et al. | 408/97 |
| 2,847,883 | 8/1958 | Bagby | 408/105 |
| 3,062,076 | 11/1962 | Craig | 408/105 |
| 3,457,650 | 7/1969 | Hagmayer | 33/185 R |

Primary Examiner—Andrew R. Juhasz
Assistant Examiner—Z. R. Bilinsky
Attorney—James H. Littlepage

[57] ABSTRACT

A drill jig has spaced opposed jaws defining a space within which a round workpiece is clamped. The upper surfaces of the jaws slope along planes which converge at a line running midway above the space occupied by the workpiece. A saddle having sloped bottom surfaces complementary with the upper surfaces of the jaws rests on the jaw tops. At the center of the saddle is a guide hole for a center punch.

5 Claims, 3 Drawing Figures

PATENTED SEP 26 1972  3,694,100

INVENTOR
LESLEY W. BLAIR

BY James A. Littlepage
ATTORNEY

ADJUSTABLE DRILL JIG

FIELD OF INVENTION

Boring And Drilling, Jigs.

KNOWN PRIOR ART

Lentino U.S. Pat. No. 2,823,564.

OBJECTS

The primary object of this invention is to provide a jig for center punching a workpiece, particularly a round one, on the exact center line of the workpiece, and to provide a support for subsequent drilling of a hole at the punch made on a drill press. A further object is to provide for the accommodation of workpieces of various diameters, and also to provide for supporting and clamping a flat workpiece between the jaws.

Figure 1:
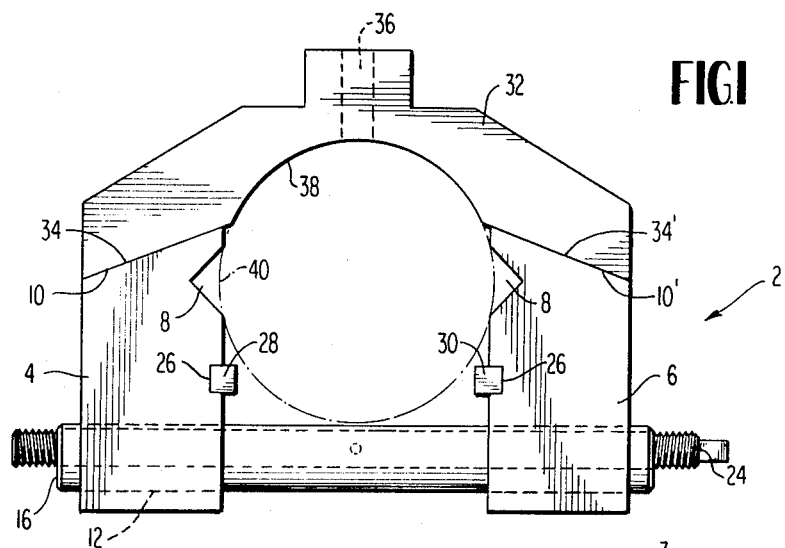
FIG. 1 is an end elevation of the jig showing in broken lines a round workpiece engaged therein.
Figure 2:
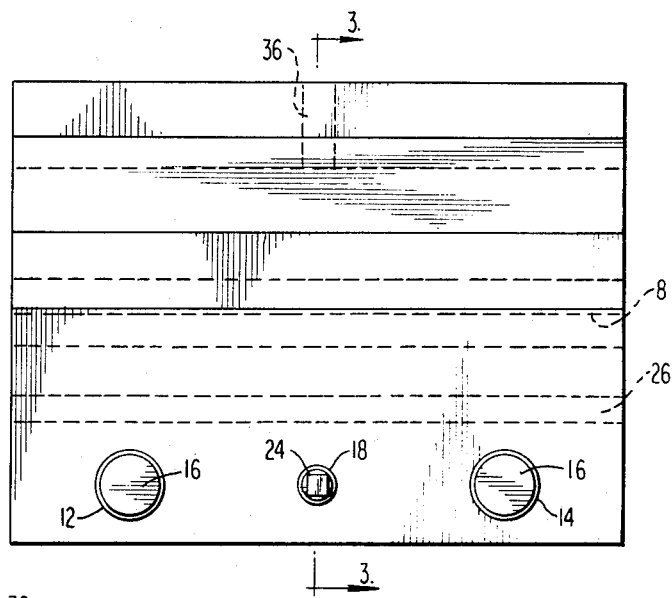
FIG. 2 is a side elevation of the device.

Resting on the top surfaces 10 or 10' of jaws 4 and 6 is a saddle 32 which has sloping bottom surfaces 34, 34' complementary with the top surfaces 10, 10' of the jaws, and extending downwardly through the center of saddle 32 is a guide hole 36 through which closely fits a center punch, not shown. It will be apparent from Figs. 1 and 3 that no matter whether the jaws be moved inwardly or outwardly with one another, the axis of center hole 36 always remains midway between the jaws. Inwardly of its sloping bottom surfaces 34, 34', the saddle is arched, as indicated at 38, to accommodate workpieces of large diameters.

Figure 3:
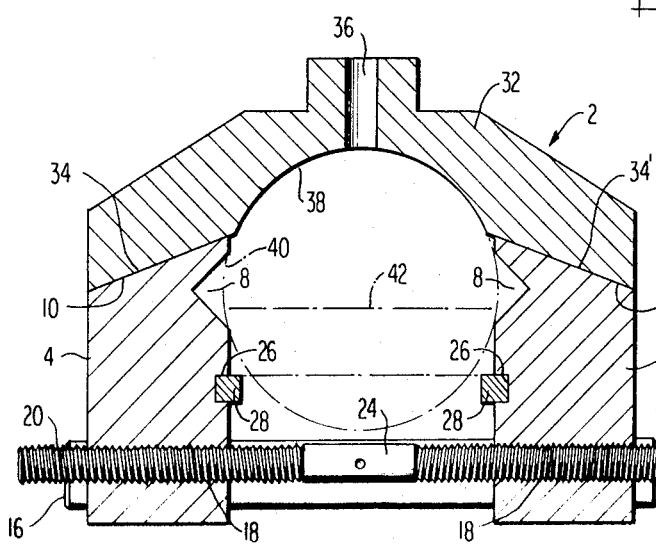
FIG. 3 is a vertical cross-section along the line 3—3 of FIG. 2, showing in broken lines both a round workpiece and a flat workpiece clamped therein. Referring now to the drawings in which like reference numerals denote similar elements, the jig 2 is comprised of an opposed pair of similar jaws 4 and 6 each provided along the inner side thereof with a V-way 8. The jaws having sloping top surfaces 10, 10' disposed along plane which, if extended, would converge along the center line of the jig. Near the bottoms of the jaws are a spaced pair of smooth bores 12, 14 extending transversely therethrough slidably accommodating guide rods 16 closely fitting therein and maintaining the jaws parallel at all times. Between the smooth bores 12 and 14 in each jaw is a threaded bore 18 for receiving a threaded end 20 or 22 of a reversely threaded screw rod 24, it being apparent that by rotating the screw rod in one direction or the other, the jaws are moved away from or towards one another. Running along the inner side of each jaw is a square groove 26 for receiving, preferably with a press fit, a rectangular strip 28 or 30 formed of conventional key stock.

A round sided cylindrical workpiece 40, such as a shaft, is shown, in broken lines, engaged between the jaws. As will be apparent from FIG. 1 and 3, the surface of workpiece 40 is nested into V-ways 8, so that the latter, in identical fashion, can straddle the horizontal center lines of the workpiece on opposite sides thereof. With saddle 32 resting on the tops of jaws 4 and 6, the axis of guide hole 36 will intersect the center line of the workpiece which runs along the top thereof as seen in FIGS. 1 and 3. Although the arched underside 38 of saddle 32 is shown adjacent the top surface of the workpiece, this has nothing to do with the centering of cap 32, this latter function being accomplished by the engagement of the sloping underside 34, 34' of the saddle against the sloping top surfaces 10, 10' of jaws 4, 6. This will be apparent from FIG. 3 wherein there is shown in broken lines a flat workpiece 42 engaged between jaws 4, 6. The flat workpiece was first rested on strips 28, 30 and then jaws 4, 6 were drawn towards one another to clamp it securely in place.

After the work has been center punched by means of a punch inserted through guide hole 36, saddle 32 is removed and the jig, with the workpiece still clamped therein, is set onto a drill press and usually a small hole is started with a center drill, and thereafter a hole to the desired size is drilled in the started hole. By this means a drilled hole true to the circumference of the workpiece can always be obtained.

I claim:

1. A jig for center punching a cylindrical workpiece preparatory to drilling, comprising, an opposed pair of similar jaws, said jaws having opposite inner sides facing one another each inner side having a way running horizontally therealong, the ways being parallel to one another and laterally opposite one another, and each jaw including a sloping flat top surface, said sloping flat top surfaces of the jaws being disposed at an angle to one another on planes which converge upon a straight line extending along a vertical plane disposed midway between the jaws, means for adjusting the jaws towards and away from one another, and a saddle resting on the upper surfaces of the jaws, said saddle having sloping lower flat surfaces in opposite sides thereof, said surfaces being at an angle to one another which is complementary to the angle of the sloping top surfaces of the jaws and being disposed on planes which converge upon the same line of convergence as the jaw top surfaces, and a vertical guide hole having an axis intersecting the line of convergence of the lower surfaces of the saddle.

2. The combination claimed in claim 1, the upper surfaces of the jaws being upon planes which converge upwardly and inwardly over the jaws.

3. The combination claimed in claim 1, the means for adjusting the jaws towards and away from one another comprising a double-ended screw rod having reversed threads on the opposite ends thereof, and threaded bores through the jaws for threadedly engaging the opposite ends of the screw rod.

4. The combination claimed in claim 1, the ways comprising v-shape grooves in the jaw faces.

5. The combination claimed in claim 4, and means forming inwardly extending ledges along the inner faces of the jaws below the V-shape grooves.

* * * * *